(12) United States Patent
Davis

(10) Patent No.: US 12,208,644 B2
(45) Date of Patent: Jan. 28, 2025

(54) AXIAL PLUNGING HALF-SHAFT ASSEMBLY

(71) Applicant: Textron Inc., Providence, RI (US)

(72) Inventor: Hunter Scott Davis, August, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 18/211,717

(22) Filed: Jun. 20, 2023

(65) Prior Publication Data

US 2023/0331041 A1  Oct. 19, 2023

Related U.S. Application Data

(63) Continuation of application No. 16/913,469, filed on Jun. 26, 2020.

(Continued)

(51) Int. Cl.
*B60B 35/00* (2006.01)
*B60K 17/22* (2006.01)
(Continued)

(52) U.S. Cl.
CPC .............. *B60B 35/00* (2013.01); *B60K 17/22* (2013.01); *F16D 3/065* (2013.01); *F16D 3/16* (2013.01);
(Continued)

(58) Field of Classification Search
CPC ..... B60B 35/00; B60B 2380/12; B60B 35/10; B60B 35/28; B60B 35/14; F16D 3/065;
(Continued)

(56) References Cited

U.S. PATENT DOCUMENTS 2,474,360 A  6/1949  Jimerson
3,460,644 A  8/1969  Porsche et al.
(Continued)

FOREIGN PATENT DOCUMENTS

CN  103057392 A  4/2013
CN  113074192 A  7/2021
(Continued)

OTHER PUBLICATIONS

Dakar 2013: preparation of participants Robby Gordon, Nasser Al-Attiyah and Gerard De Rooy. Article showing Dakar Hummer; Oct. 19, 2012.
(Continued)

*Primary Examiner* — Karen Beck
(74) *Attorney, Agent, or Firm* — Billion & Armitage

(57) ABSTRACT

A half-shaft assembly includes a first constant velocity (CV) joint, a second CV joint and an axial movement joint connected between the first CV joint and the second CV joint. The axial movement joint includes a first shaft coupled to the first CV joint and a second shaft coupled to the second CV joint, wherein mechanical input received on the first shaft is communicated to the second shaft, and wherein the second shaft slides axially within the first shaft. The axial movement joint further includes an axial boot cover coupled on a first end to the first shaft and on a second end to the second shaft that accommodates axial movement of the first shaft relative to the second shaft. The first constant velocity (CV) joint is coupled to provide torsional input received at an input to the first shaft, the first CV joint having a first CV boot cover. The second CV joint coupled to provide torsional output received from the second shaft to an output, the second CV joint having a second CV boot cover.

17 Claims, 18 Drawing Sheets

Related U.S. Application Data

(60) Provisional application No. 62/869,508, filed on Jul. 1, 2019.

(51) Int. Cl.
*F16D 3/06* (2006.01)
*F16D 3/16* (2006.01)

(52) U.S. Cl.
CPC ...... *B60B 2380/12* (2013.01); *F16D 2300/00* (2013.01); *F16D 2300/06* (2013.01); *F16D 2300/08* (2013.01); *Y10S 464/906* (2013.01)

(58) Field of Classification Search
CPC .... F16D 3/16; F16D 2300/06; F16D 2300/08; F16D 3/223; F16D 3/845; F16D 1/116; F16D 3/221; Y10S 464/906
See application file for complete search history.

(56) References Cited

U.S. PATENT DOCUMENTS

| | | | |
|---|---|---|---|
| 3,608,936 A | 9/1971 | Karden | |
| 4,103,514 A | 8/1978 | Grosse-Entrup | |
| 4,177,654 A | 12/1979 | Aucktor | |
| 4,223,758 A | 9/1980 | Schopf | |
| 4,254,639 A | 3/1981 | Teramachi | |
| 4,705,491 A | 11/1987 | Andersson | |
| 4,884,399 A | 12/1989 | Morris | |
| 5,026,325 A | 6/1991 | Welschof | |
| 5,036,939 A | 8/1991 | Johnson et al. | |
| 5,611,733 A | 3/1997 | Jacob et al. | |
| 5,624,318 A | 4/1997 | Jacob et al. | |
| 5,725,453 A | 3/1998 | Zalewski et al. | |
| 5,836,599 A | 11/1998 | Rein | |
| 5,855,386 A | 1/1999 | Atkins | |
| 6,112,843 A | 9/2000 | Wilcox et al. | |
| 6,145,416 A | 11/2000 | Bonniot | |
| 6,217,456 B1 | 4/2001 | Jacob | |
| 6,234,908 B1 | 5/2001 | Jacob | |
| 6,254,487 B1 | 7/2001 | Jacob | |
| 6,306,045 B1 | 10/2001 | Jacob | |
| 6,390,928 B1* | 5/2002 | Welschof | F16D 3/2237 464/145 |
| 6,422,369 B1 | 7/2002 | McCalla | |
| 6,585,602 B2 | 7/2003 | Cermak et al. | |
| 6,851,691 B2 | 2/2005 | Rasidescu et al. | |
| 6,874,392 B1 | 4/2005 | Wu | |
| 6,902,487 B2 | 6/2005 | Welschof | |
| 7,018,317 B2 | 3/2006 | Tweet | |
| 7,229,358 B2 | 6/2007 | Carlini et al. | |
| 7,281,984 B2 | 10/2007 | Foster-Hamilton et al. | |
| 7,363,999 B2 | 4/2008 | Hastings | |
| 7,488,257 B1 | 2/2009 | Booker et al. | |
| 7,510,199 B2 | 3/2009 | Nash et al. | |
| 7,670,229 B2 | 3/2010 | Disser et al. | |
| 7,673,719 B2 | 3/2010 | Buschena | |
| 7,762,894 B2 | 7/2010 | Momiyama et al. | |
| 7,905,540 B2 | 3/2011 | Kiley et al. | |
| 8,070,611 B2 | 12/2011 | Wormsbaecher et al. | |
| 8,083,245 B2 | 12/2011 | Hatzikakidis | |
| 8,118,683 B2 | 2/2012 | Disser et al. | |
| 8,328,649 B2 | 12/2012 | Disser | |
| 8,388,457 B2 | 3/2013 | Keller | |
| 8,523,209 B2 | 9/2013 | Pollmeyer et al. | |
| 8,573,337 B1 | 11/2013 | Luoma et al. | |
| 8,649,950 B2 | 2/2014 | Yang | |
| 8,746,394 B2 | 6/2014 | Kuramoto et al. | |
| 8,746,719 B2 | 6/2014 | Safranski et al. | |
| 8,764,039 B2 | 7/2014 | Keller | |
| 8,870,667 B2 | 10/2014 | Buth et al. | |
| 9,381,785 B2 | 7/2016 | Gale | |
| 9,493,185 B2 | 11/2016 | Dada et al. | |
| 9,623,909 B1 | 4/2017 | Hirano | |
| 9,623,912 B2 | 4/2017 | Schlangen | |
| 10,036,428 B2 | 7/2018 | Doner et al. | |
| 10,124,659 B2 | 11/2018 | Bessho et al. | |
| 10,160,497 B2 | 12/2018 | Wimpfheimer et al. | |
| 10,196,094 B2 | 2/2019 | Tsumiyama et al. | |
| 10,280,683 B1 | 5/2019 | Smid | |
| 10,350,952 B2 | 7/2019 | Gordon et al. | |
| 10,358,029 B2 | 7/2019 | Gruschow et al. | |
| 2002/0166603 A1 | 11/2002 | Camacho | |
| 2002/0177485 A1* | 11/2002 | Cermak | F16C 3/035 464/167 |
| 2003/0090128 A1 | 5/2003 | Seksaria et al. | |
| 2004/0216942 A1 | 11/2004 | Tanaka et al. | |
| 2005/0124420 A1* | 6/2005 | Kuczera | F16D 3/2055 464/111 |
| 2006/0012145 A1 | 1/2006 | Gardner | |
| 2007/0024044 A1 | 2/2007 | Ogawa | |
| 2010/0143075 A1* | 6/2010 | Disser | F16D 1/116 464/107 |
| 2010/0326761 A1 | 12/2010 | Melcher | |
| 2011/0127135 A1 | 6/2011 | Grogg et al. | |
| 2012/0031688 A1 | 2/2012 | Safranski | |
| 2012/0031693 A1* | 2/2012 | Deckard | B23P 6/00 180/68.3 |
| 2012/0055729 A1 | 3/2012 | Bessho | |
| 2012/0063842 A1 | 3/2012 | Keller | |
| 2012/0223500 A1 | 9/2012 | Kinsman | |
| 2013/0033070 A1 | 2/2013 | Kinsman et al. | |
| 2013/0197756 A1 | 8/2013 | Ramirez Ruiz | |
| 2013/0319785 A1 | 12/2013 | Spindler | |
| 2014/0103627 A1 | 4/2014 | Deckard et al. | |
| 2014/0124279 A1 | 5/2014 | Schlangen et al. | |
| 2014/0183327 A1 | 7/2014 | Takahashi et al. | |
| 2014/0262584 A1 | 9/2014 | Lovold et al. | |
| 2014/0345964 A1 | 11/2014 | Nakaoka et al. | |
| 2015/0061275 A1 | 3/2015 | Deckard | |
| 2015/0094158 A1 | 4/2015 | Mondragon et al. | |
| 2015/0137481 A1 | 5/2015 | Manternach et al. | |
| 2015/0292371 A1 | 10/2015 | Barnes | |
| 2016/0176287 A1 | 6/2016 | Ripley et al. | |
| 2016/0257360 A1 | 9/2016 | MacKenzie | |
| 2017/0001549 A1 | 1/2017 | Bessho | |
| 2017/0029036 A1 | 2/2017 | Proulx et al. | |
| 2017/0050483 A1 | 2/2017 | Gordon | |
| 2017/0050517 A1 | 2/2017 | Higuchi | |
| 2017/0050673 A1 | 2/2017 | Gordon | |
| 2017/0122377 A1 | 5/2017 | Fukuzawa et al. | |
| 2017/0174027 A1 | 6/2017 | Mailhot et al. | |
| 2017/0248169 A1 | 8/2017 | Gordon | |
| 2017/0292570 A1 | 10/2017 | Ketchel et al. | |
| 2018/0058821 A1 | 3/2018 | Kwiatkowski et al. | |
| 2018/0326846 A1 | 11/2018 | Soto Velasco | |
| 2020/0248750 A1 | 8/2020 | Gordon | |
| 2021/0001667 A1* | 1/2021 | Davis | F16D 3/845 |
| 2021/0108683 A1* | 4/2021 | Oh | F16D 1/116 |

FOREIGN PATENT DOCUMENTS

| | | |
|---|---|---|
| DE | 4230529 A1 | 3/1994 |
| DE | 102006016843 | 10/2007 |
| EP | 1081023 A1 | 3/2001 |
| WO | 9002634 A1 | 3/1990 |
| WO | 2014059258 A1 | 4/2014 |

OTHER PUBLICATIONS

Image Off-Road Vehicle, http:www.race-dezert.com/forum/threads/extreme-baja-karts.37384; Dec. 23, 2007.

*Speed RMG Partners, LLC, Robby Gordon, and Todd Romano*, Plaintiffs, v. *Arctic Cat Sales Inc., Arctic Cat Inc., Textron Specialized Vehicles Inc., and Textron Inc.*, Defendants. File No. 20-cv-609, Jury Trial Proceedings—vol. VIII, Dec. 14, 2022.

"1400HP Buckshot Racing sand car build Member Rides & Builds Show off your whip, Show off your System! SMD Forum", retrieved May 4, 2016 from http://www.stevemeadedesigns.com/board/topic/1375431400hpbuckshotracingsandcarbuild/.

"Checkmate: Speed UTV Live Presentation No. 108", Speed UTV, Retrieved Apr. 5, 2023 from https://www.youtube.com/watch?v=2tjmuXp9Tw4.

(56) References Cited

OTHER PUBLICATIONS

"Deposition of Michael J. Mckeen, Feb. 16, 2021", *Speed RMG Partners* vs *Arctic Cat Sales Inc.*, Case No. 0:20-cv-00609-SRN-LIB, United States District Court for the District of Minnesota.
"Monster Energy Buckshot Racing Sandrail at the Orange County Sand Show", YouTube Video, https://www.youtube.com/watch?v=UfroFVLVw; Published Sep. 15, 2012.
"RCV Ultimate UTV Axle for Polaris IP900 Front ('11-'14)", Aug. 20, 2015, 1-2.
"RG Pro—Arctic Cat brochure".
"U.S. Appl. No. 14/498,216 PTO File History".
"Universal Joint and Driveshaft Design Manual, AE-7, Society of Automotive Engineers", Inc., Warrendale, PA, pp. 311-319, TJ1079. S62. (Year: 1979), 311-319.
Bertrand, Blanquet , "Front structure of a motor car and motor car equipped with this structure", EPO, EP 1 081 023 A1, Machine Translation of Description, Mar. 7, 2001, 8 pages.
Brandel , et al., "Car with exchangeable rear engine—Has rear engine and wheels mounted in detachable subframe plugging into car shell and fixed by vertical bolts", EPO, DE 4 230 529 A1, Machine Translation of Description, Mar. 17, 1994, 5 pages.
Fu , et al., "An engine suspension assembly", PE2E database, CN 103057392 A, Machine Translation of Description, Apr. 24, 2013, 6 pages.
Gordon , et al., "Universal Wishbone Trailing Arm—Specification", Aug. 21, 2015, U.S. Appl. No. 62/208,531, filed 2015.
Gordon , et al., "Universal Wishbone Trailing Arm—Drawings", Aug. 21, 2015, U.S. Appl. No. 62/208,531.

\* cited by examiner

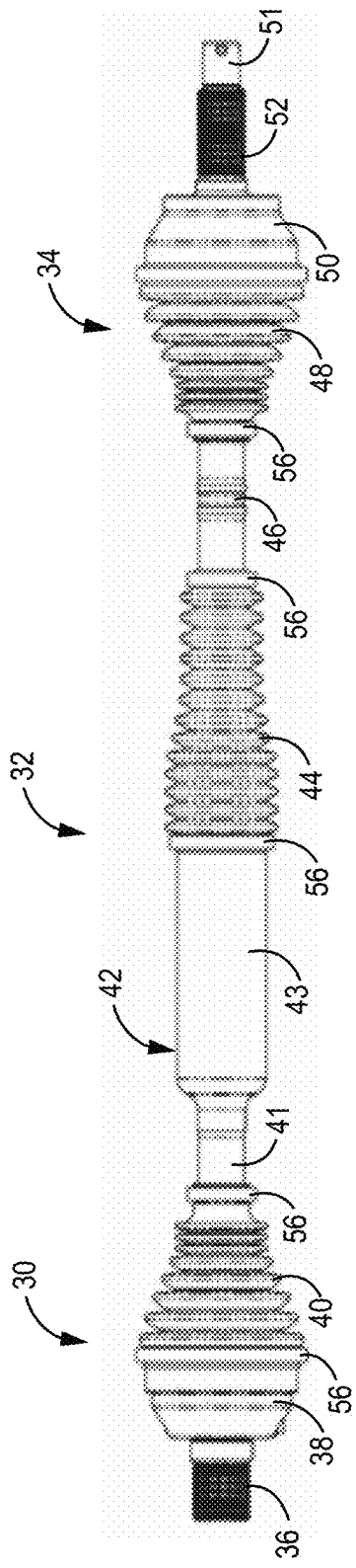
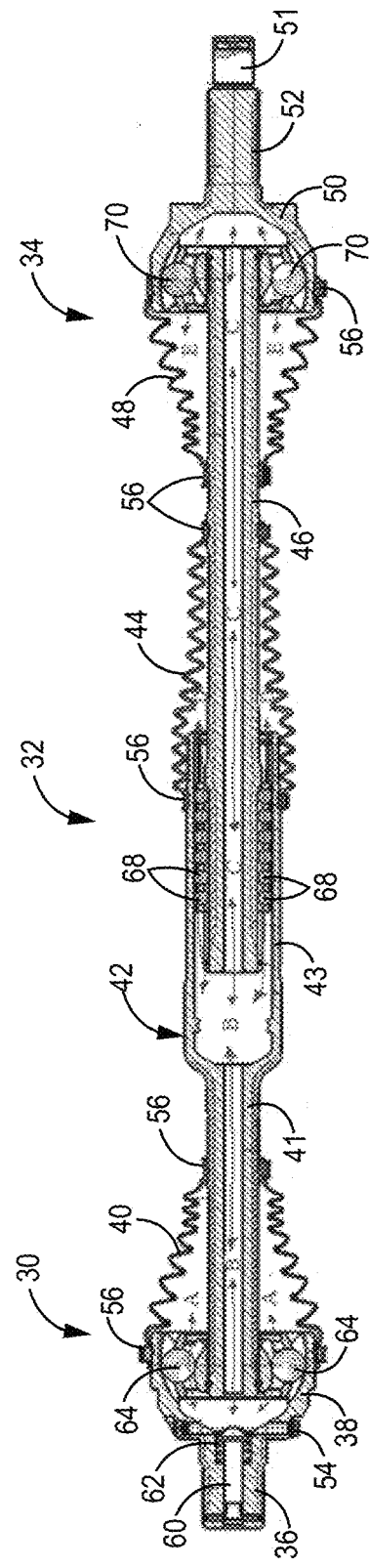
FIG. 3
FIG. 4

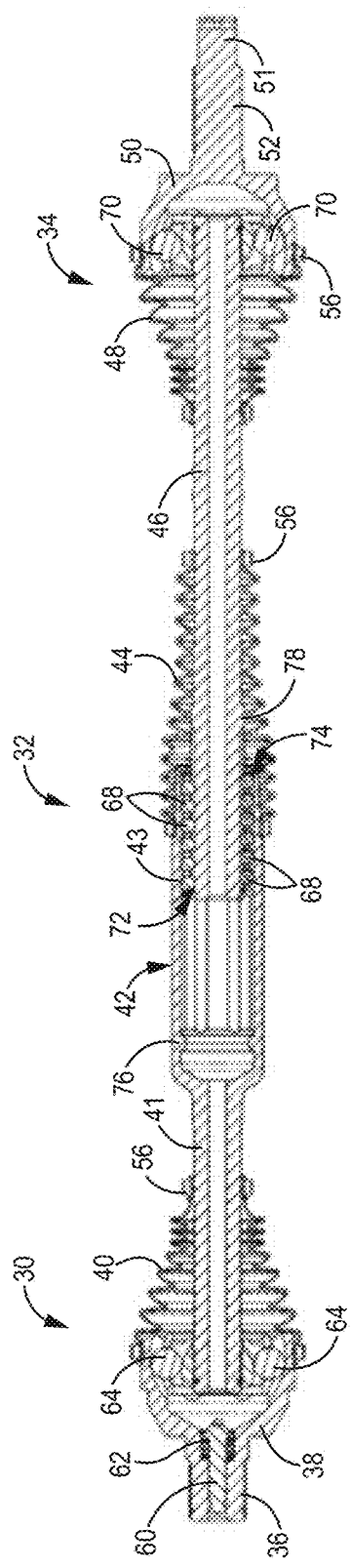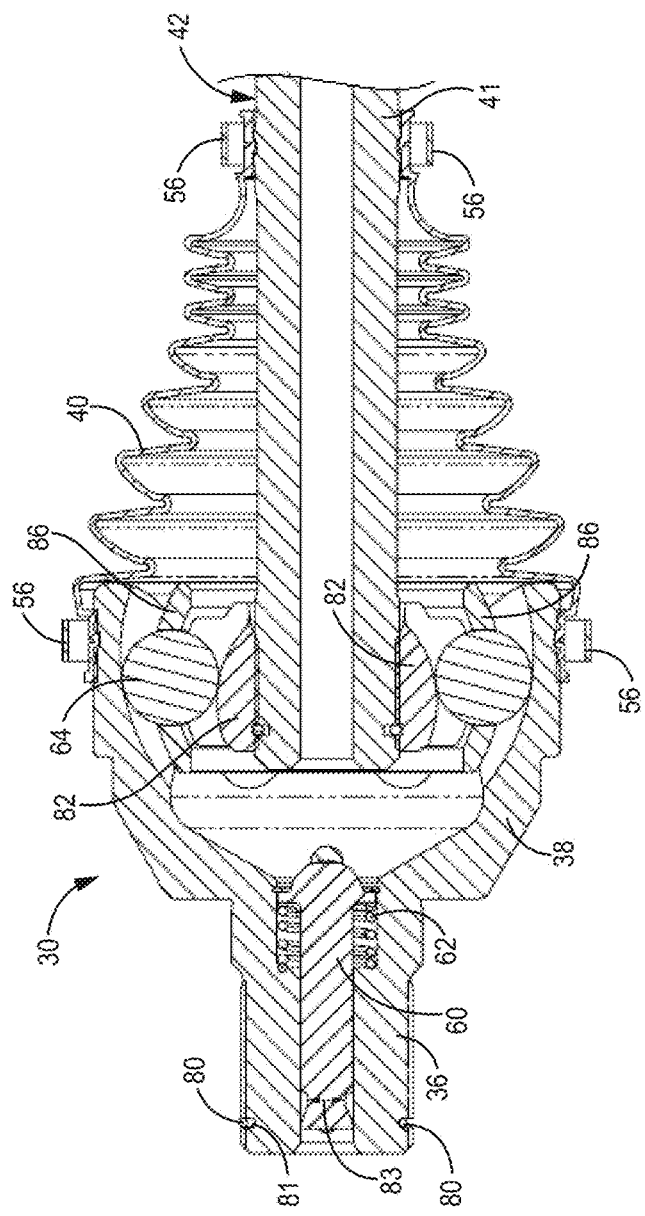
FIG. 6
FIG. 7

AXIAL PLUNGING HALF-SHAFT ASSEMBLY

RELATED APPLICATION(S)

This application is a Continuation of U.S. application Ser. No. 16/913,469, filed on Jun. 26, 2020, which claims the benefit of U.S. Provisional Application No. 62/869,508, filed on Jul. 1, 2019, and which applications are incorporated herein by reference. A claim of priority to all, to the extent appropriate, is made. The present application is related to co-pending U.S. application Ser. No. 16/102,135, titled "Off-Road Recreational Vehicle", filed Aug. 13, 2018, which is incorporated by reference herein.

BACKGROUND

Off-road recreational vehicles such as side-by-side recreational off-highway vehicles ("ROVs") or all-terrain vehicles ("ATVs"), are quite capable in a wide variety of riding environments and situations, whether for sport or utility purposes. The vehicles can be easy to enter and exit and easy to operate with controls and ergonomics somewhat similar to automobiles. However, unlike most automobiles, off-road recreational vehicles can be driven on harsh off-road terrain.

Power developed by the off-road vehicle is communicated to the wheels by a driveline system. For example, power provided to a rear differential is transmitted to the respective wheels by half-shaft assemblies. To accommodate movement of the wheels relative to the driveline during operation the half-shaft assemblies utilize constant velocity (CV) joints to transmit a mechanical power from an input shaft to an output shaft at a constant velocity while providing a certain amount of angular freedom between the respective shafts. In addition, in some cases the half-shaft assembly is required to provide a length of axial movement or plunge.

DESCRIPTION OF THE DRAWINGS

FIG. 3 is a side view of the half-shaft assembly having an inboard constant velocity (CV) joint, outboard CV joint, and axial movement joint according to some embodiments.

FIG. 4 is a cross-sectional view of the half-shaft assembly that illustrates the flow of air between various sections according to some embodiments.

FIG. 6 is a cross-sectional view of the half-shaft assembly taken along line 6-6 in FIG. 5

FIG. 7 is a magnified cross-sectional view of the inboard CV joint shown in FIG. 6 according to some embodiments.

DETAILED DESCRIPTION

The present disclosure is directed to a half-shaft assembly utilized in various types of vehicles, such as side-by-side utility vehicles. The half-shaft assembly transmits power from the driveline (e.g., rear differential, front differential, etc.) to each respective wheel. The half-shaft assembly includes a first constant velocity (CV) joint, a second CV joint, and an axial movement joint that includes a first shaft connected to the first CV joint and a second shaft connected to the second CV joint. The axial movement joint allows movement—referred to herein as axial plunge—of the half-shaft along the axis of the shaft. In some embodiments, the first CV joint includes a first CV boot cover, the second CV joint includes a second CV boot cover, and the axial movement joint includes an axial boot cover. In some embodiments, one or both of the first shaft and the second shaft are hollow such that the chamber defined by the axial boot cover has access to or is in fluid communication with the volume of air located in one or both of the first and second shafts. In some embodiments, the axial boot cover is also fluidly connected with one or both of the chambers defined by the first CV boot cover or the second CV boot cover associated with the first and second CV joints, respectively. During axial plunge of the half-shaft, the volume of the chamber or region within the axial boot cover changes in response to collapse/expansion of the boot. Connecting the chambers defined by the axial boot cover increases the volume of air available and therefore mitigates the effect of expansion/collapse on the pressure within the axial boot cover.

Figure 1A:
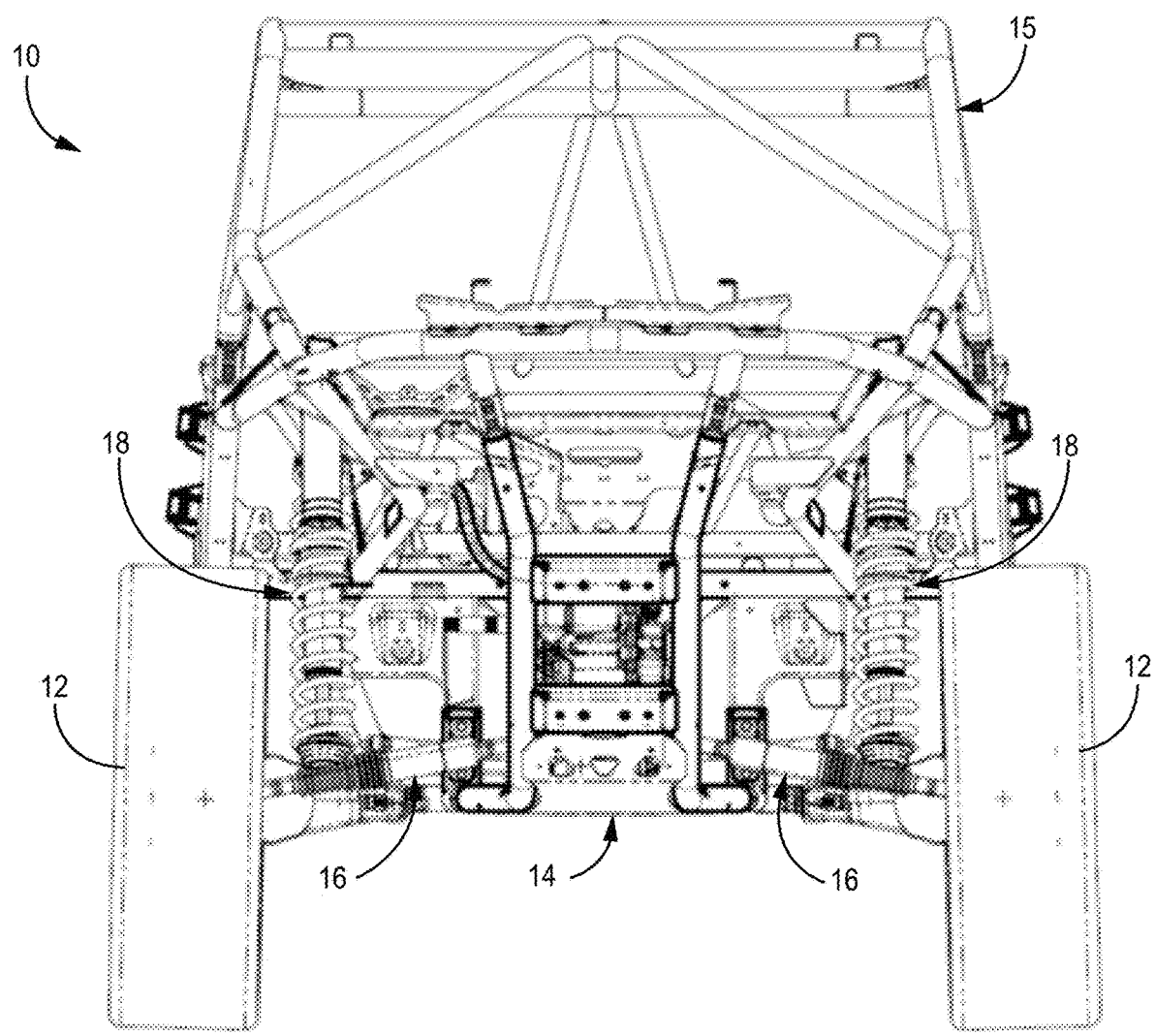
FIG. 1a is a rear view of a utility vehicle according to some embodiments.
Figure 1B:
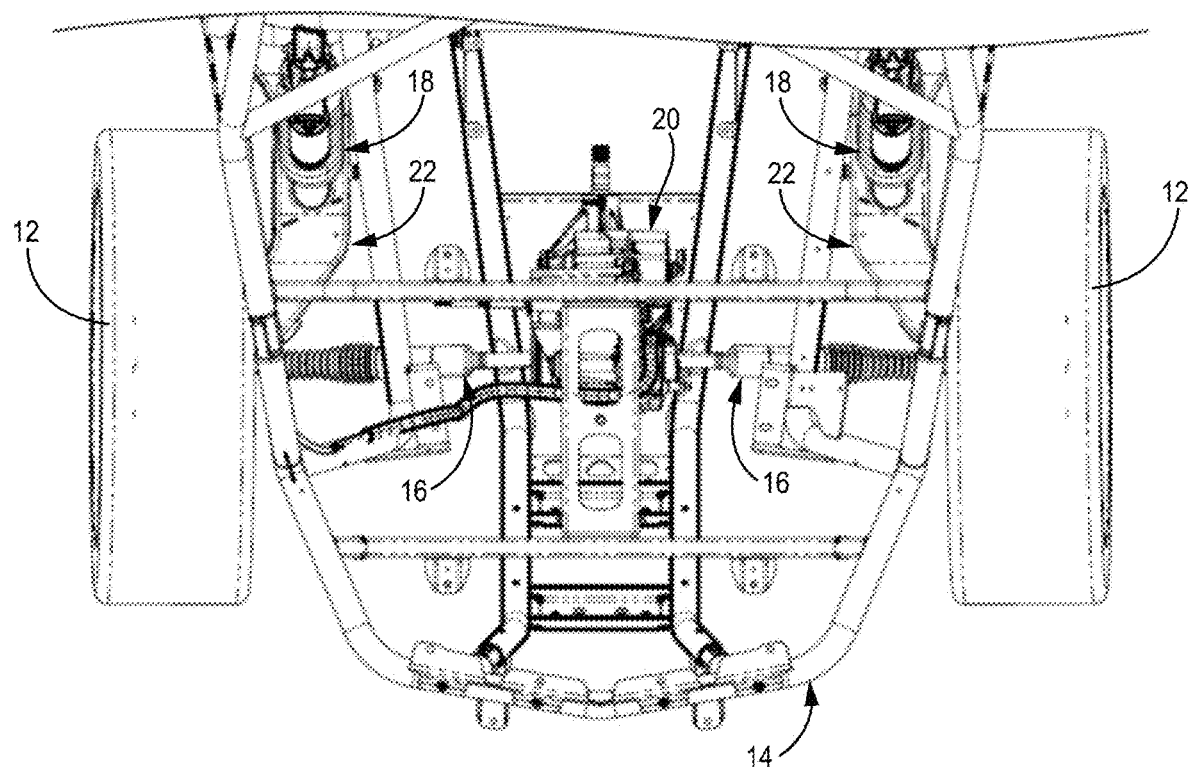
FIG. 1b is a top view of a rear portion of the utility vehicle according to some embodiments.
Figure 1C:
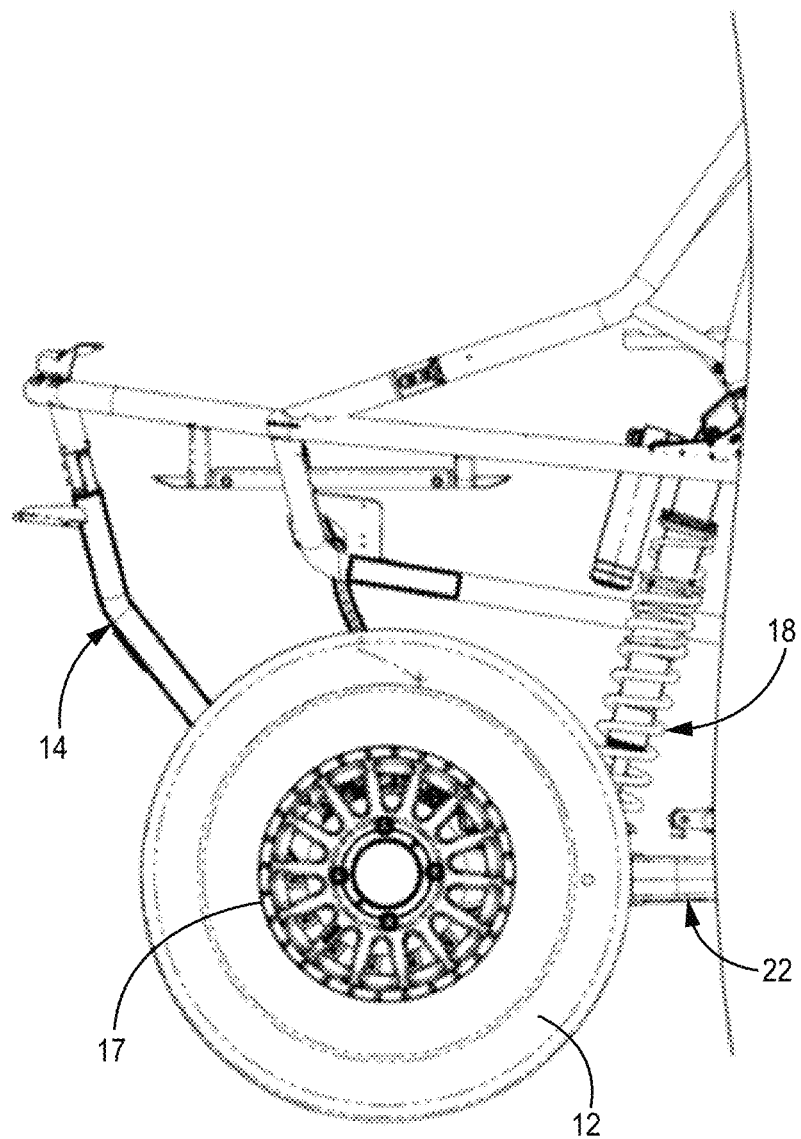
FIG. 1c is a side view of the rear portion of the utility vehicle according to some embodiments.
Figure 2A:
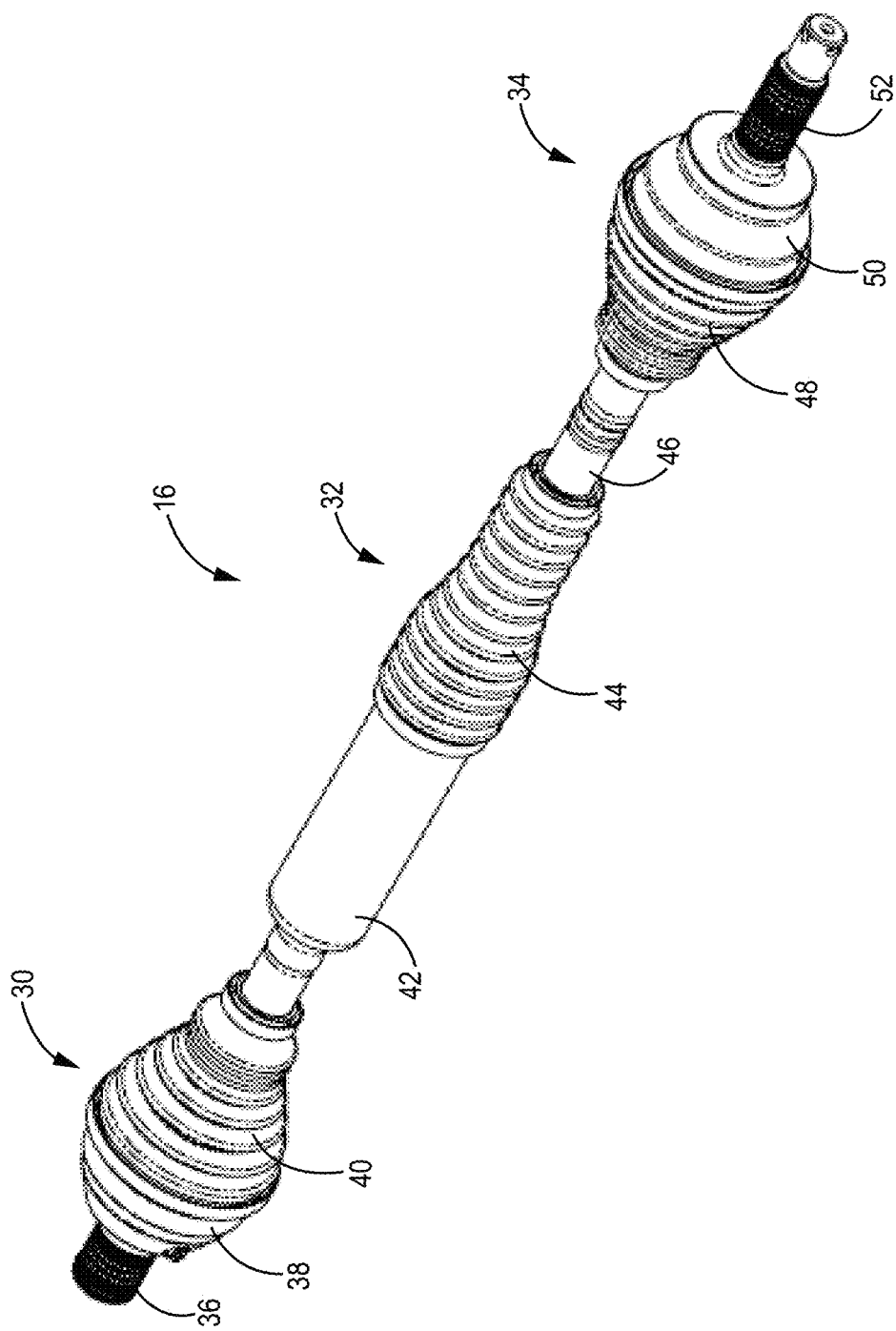
FIGS. 2a and 2b are perspective views of a half-shaft assembly having an inboard constant velocity (CV) joint, outboard CV joint, and axial movement joint according to some embodiments.
Figure 2B:
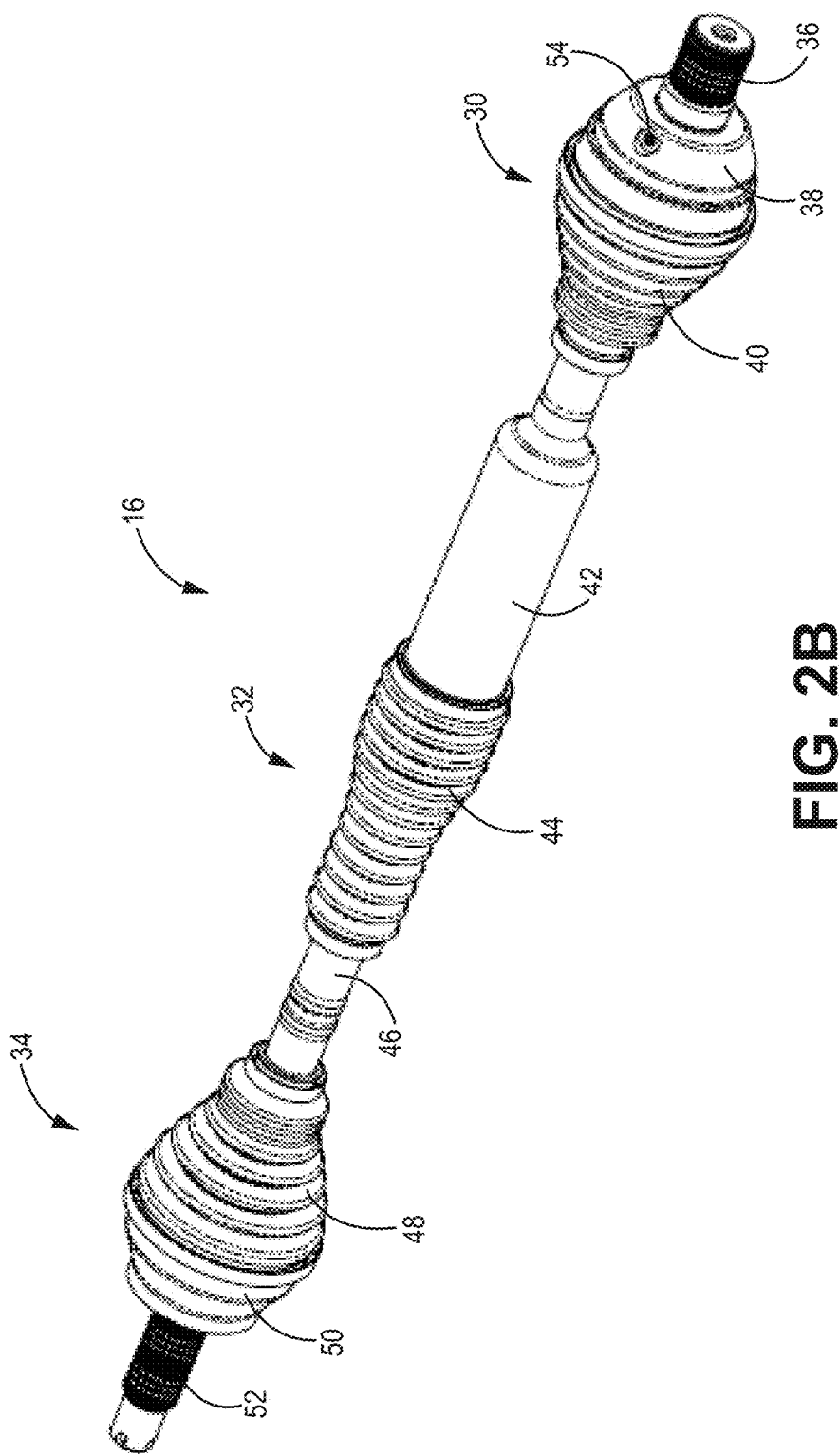

Referring to FIGS. 1a-1c, a utility vehicle 10 is shown according to some embodiments. Although a side-by-side type utility vehicle is shown in FIGS. 1a-1c the half-shaft assembly described herein may be utilized on other types of vehicles. In some embodiments, the utility vehicle 10 includes a plurality of ground-engaging members 12, a frame 14, a roll-over protection system (ROPS) 15, half-shaft assemblies 16, shock absorbers 18, a prime mover or engine 20, and trailing arms 22.

In some embodiments, the utility vehicle 10 includes a plurality (e.g., four) ground-engaging members 12 (e.g., tires). Each ground-engaging member 12 includes a wheel 17 that is coupled to the frame 14 and driveline of the utility vehicle 10. As shown in FIG. 1b, trailing arms 22 are connected to the frame 14 on one end and to the wheels 17 on the distal or opposite end. In addition, a shock absorbers 18 is connected to the frame 14 on one end and to the trailing arm 22 on the opposite end. Power is transmitted to the wheels 17 by the half-shaft assemblies 16. As described in more detail below, in some embodiments each half-shaft assembly 16 includes an outboard constant velocity (CV) joint, an inboard CV joint, and an axial movement joint connected between the outboard CV joint and the inboard CV joint. The inboard CV joint is connected to the driveline (e.g., rear differential/drive, front differential/drive) on an input side of the half-shaft assembly. As the name implies, the velocity of the output is equal to the velocity of the input, but allows for angular deflection of the shaft associated with the output of the inboard CV joint relative to the input (e.g., the driveline). In some embodiments, an outboard CV joint connects the half-shaft assembly 16 to the wheel 17. The outboard CV joint provides an output velocity equal to the input velocity and again allows for angular deflection of the input relative to the output (e.g., the wheel). In some embodiments, the inboard CV joint and the outboard CV joint do not permit axial movement or plunge. In some embodiments, the inboard CV joint and outboard CV joint permit limited axial movement. To accommodate the axial movement of the half shaft required as a result of wheel moving up and down, the half-shaft assembly 16 includes an axial movement joint to permit expansion/collapse of the length of the half-shaft assembly 16.

Referring now to FIGS. 2a-4, a half-shaft assembly 16 is provided according to some embodiments. The half-shaft assembly 16 includes inboard CV joint 30, an axial movement joint 32 and an outboard CV joint 34. The inboard CV joint 30 includes an input shaft 36, CV housing 38, and CV boot cover 40. As described in more detail below, the inboard CV joint 30 includes an inner race, a cage, and a plurality of ball bearings 64 retained by the cage. The axial movement joint 32 includes a female shaft 42, a male shaft 46, and an axial boot cover 44 coupled to the female shaft 42 and to the male shaft 46. The female shaft 42 may include a smaller diameter portion 41 and a larger diameter portion 43. In the embodiment illustrated in FIG. 4, one end of the axial boot cover 44 is coupled to the outer surface of the larger diameter portion 43 of the female shaft 42 and the other end is coupled to the outer surface of the male shaft 46. As described in more detail below, in some embodiments the axial movement joint is implemented using a ballspline mechanism housed between the female shaft 42 and the male shaft 46 that includes a plurality of ball bearings retained within a housing. The ballspline mechanism allows the male shaft 46 to move axially relative to the female shaft 42 to provide the desired axial plunge. Outboard CV joint 34 includes an output shaft 51, CV boot cover 48, and CV housing 50. As described in more detail below, the outboard CV joint 34 includes an inner race, a cage, and a plurality of ball bearings 70 retained by the cage.

Power provided at input shaft 36 is communicated via inboard CV joint 30, axial movement joint 32, and outboard CV joint 34 to output shaft 51. The ballspline mechanism allows for axial plunge of the male shaft 46 relative to the female shaft 42.

Referring to FIG. 4, the half-shaft assembly 16 includes a plurality of enclosed chambers or regions, including the region within the inboard CV boot cover 40 (labeled 'A'), the region within hollow female shaft 42 (labeled 'B'), the region within hollow male shaft 46 (labeled 'C'), the region within axial boot cover 44 (labeled 'D'), and the region within outboard CV boot cover 48 (labeled 'E'). In some embodiments, these regions are in fluid communication with one another (i.e., share the same volume of air). The regions in fluid communication define a single volume of space. This is illustrated in FIG. 4 by the arrows traversing from region 'A' to region 'B', from region 'B' to regions 'C' and 'D', and from region 'C' to region 'E'. A benefit of this approach is that sudden axial movement resulting in a decrease/increase in the volume of space—for example in the volume of space 'D' associated with axial boot cover 44—does not result in a rapid change in pressure because region 'D' shares a volume with the other regions and airflow between the regions allows the change in volume that would otherwise result in a large change in pressure to be mitigated across the total volume of all connected regions.

In the embodiment shown in FIG. 4, each of the regions 'A', 'B', 'C', 'D', and 'E' are in communication with one another. In other embodiments though, various combinations of regions may be in combination with one another. For example, in one embodiment the male shaft may be a solid shaft (rather than hollow), such that regions 'D' and 'B' and 'A' are in communication with one another or share a volume, but not regions 'C' or 'E'. In another embodiment, a portion of female shaft 42 (e.g., smaller diameter portion 41) may be a solid shaft (rather than hollow) such that region 'D', at least a portion of region 'B', region 'C' and region 'E' are in communication with one another or share volume, but not regions 'A' and the portion of region 'B' included in the smaller diameter portion 41.

Referring now to FIGS. 5-14, various cross-sectional views of the half-shaft assembly are shown. In particular, FIGS. 6-10 are cross-sectional views taken along line 6-6 in FIG. 5 and FIGS. 11-14 are cross-sectional views taken along line 11-11 in FIG. 5.

Referring to FIGS. 6-10, the cross-sectional view illustrates the various components making up the inboard CV joint 30, the axial movement joint 32 and the outboard CV joint 34. In particular, FIG. 7 is a cross-sectional view of the outboard CV joint 30, which includes input shaft 36, CV housing 38 and CV boot cover 40. In some embodiments, snap ring 80 is utilized to secure the input shaft 36 to the driveline (e.g., rear differential). The snap ring 80 is positioned within groove 81 formed within input shaft 36. When in a radial outward position, snap ring 80 prevents axial movement of input shaft 36 relative to the driveline. When in a radial inward position in which snap ring 80 slides into groove 81, the input shaft 36 is removable from the driveline. In some embodiments, the position of the snap ring is maintained by two or more radial pins (not shown in this view) extending from axial plunge pin 60 to snap ring 80. When axial plunge pin 60 is in a locked position (as shown in FIG. 7), the radial pins extent outward and force snap ring 80 to the outer circumference position. When plunge pin 60 is plunged axially the radial pins slide radially inward due to the narrow neck 83 of plunge pin 60, allowing snap ring 80 to slide within groove 81 and thereby allowing the input shaft 36 to be removed axially from the driveline. Further information regarding the operation of the plunge pin is provided in U.S. patent application Ser. No. 16/102,135, titled "Off-Road Recreational Vehicle", filed Aug. 13, 2018, now U.S. Pat. No. 11,028,883, which is incorporated by reference herein.

In some embodiments, inboard CV joint 30 houses within CV housing 38 a plurality of ball bearings 64, a cage 86 for retaining the ball bearings 64, and an inner race 82. CV housing 38 includes slots for receiving respective ball bearings. Likewise, inner race 82 includes slots for receiving the respective ball bearing, with the position of the ball bearings relative to one another being maintained by cage 86. Rotation of CV housing 38 is communicated via ball bearings 64 to inner race 82, which is coupled to the smaller diameter portion 41 of female shaft 42. The CV boot cover 40 is coupled on a first end to the outer circumference of CV housing 38 via a clamp 56 and on the opposite end to the smaller diameter portion 41 of female shaft 42 via clamp 56. In some embodiments, clamps 56 are utilized to secure CV boot covers 40 and 48 to the respective shafts, and further are utilized to secure axial boot cover 44 to the respective shafts. In other embodiments, other well-known methods may be utilized to secure the CV boot covers and/or axial boot covers to the respective shafts. The CV boot cover 40 is packed with grease and acts to prevent water and dirt from entering the CV joint 30. In addition, the CV boot cover 40 has an accordion structure that allows it to flex in response to angular movement of the female shaft 42 relative to the input shaft 36. As described above with respect to FIG. 4, in some embodiments air is allowed to flow between the area within CV boot cover 40 (region 'A') and the hollow female shaft 42 (region 'B'). This is more readily apparent with reference to FIGS. 11-14, which illustrates the flowpath between the respect regions.

Figure 8:
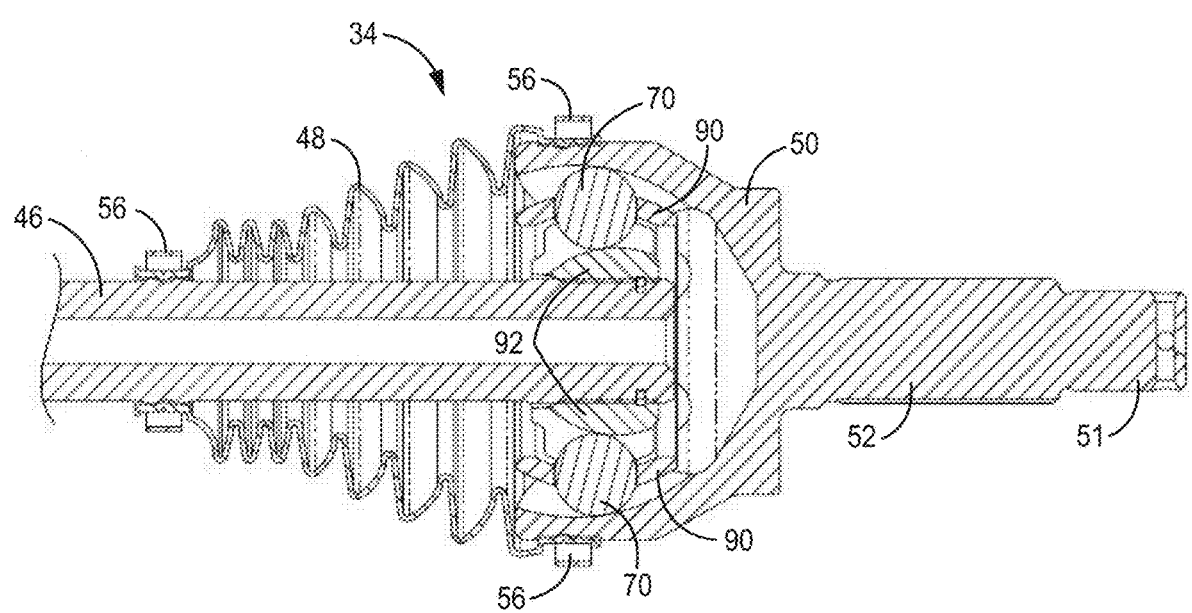
FIG. 8 is a magnified cross-sectional view of the outboard CV joint shown in FIG. 6 according to some embodiments.

Referring to FIG. 8, a cross-sectional view of the outboard CV joint 34 is shown, which includes output shaft 52, CV housing 50 and CV boot cover 48. CV joint 34 acts to transmit the rotational power provided by male shaft 46 to output shaft 52 through variable angles of alignment between the male shaft 46 and the output shaft 52. As described above with respect to the inboard CV joint 30, the outboard CV joint 34 includes a plurality of ball bearings 70, a cage 90 for maintaining the ball bearings in position relative to one another, and an inner race 82 coupled to the male shaft 46. The ball bearings are positioned within slots in the inner race and likewise positioned within slots in the interior surface of the CV housing 50. Power provided by male shaft 46 is transmitted to the outboard CV housing 50 via the inner race 92 and the ball bearings 70.

The CV boot cover 48 is secured on a first end to the male shaft 46 via a clamp 56 and to the outer diameter of the CV housing 50 via a clamp 56. The interior of CV boot cover 48 is packed with grease to lubricate the CV joint, wherein the CV boot cover 48 acts to prevent water and dirt from entering the CV joint. The CV boot cover 48 has an accordion structure that allows it to flex in response to angular alignment of the male shaft 46 relative to the output shaft 52. In addition, as described above with respect to FIG. 4, in some embodiments air is allowed to flow between the area within CV boot cover 48 (region 'E') and the hollow male shaft 46 (region 'C'). This is more readily apparent with reference to FIGS. 11-14, which illustrates the flowpaths between the respect regions.

Figure 9:
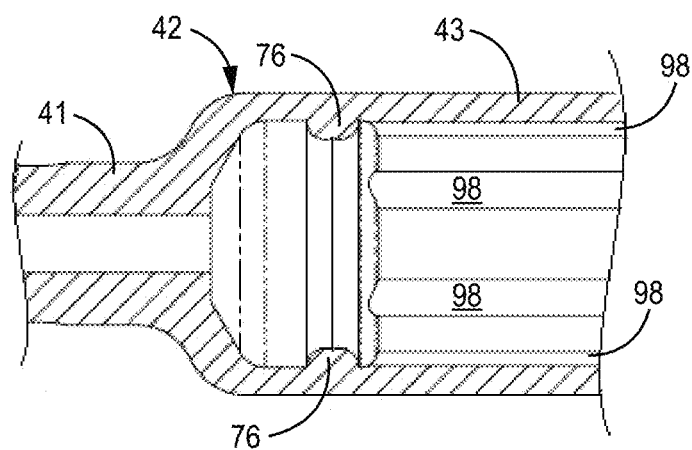
FIG. 9 is a magnified cross-sectional view of a portion of the axial movement joint shown in FIG. 6 according to some embodiments.
Figure 10:
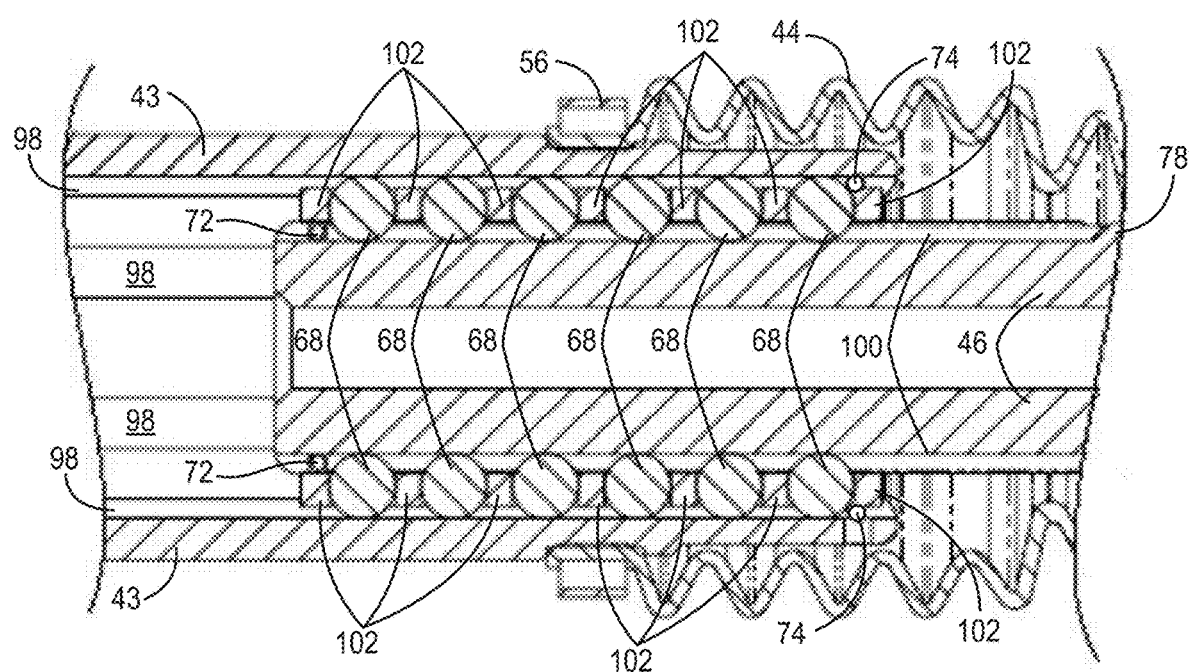
FIG. 10 is a magnified cross-sectional view of a portion of the axial movement joint shown in FIG. 6 according to some embodiments.
Figure 11:
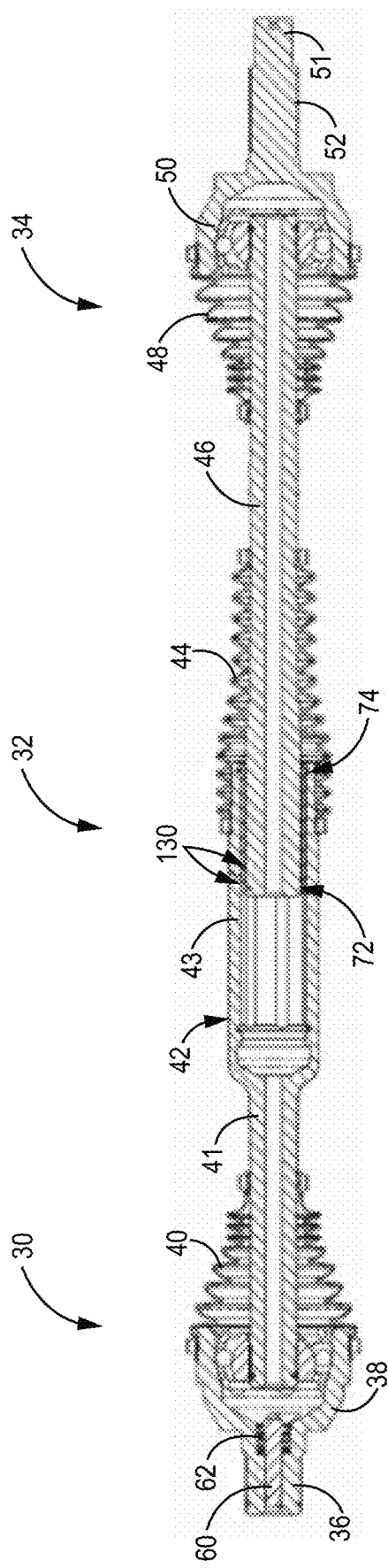
FIG. 11 is a cross-sectional view of the half-shaft assembly taken along line 11-11 in FIG. 5.

Referring to FIGS. 9 and 10, cross-sectional views of portions of the axial movement joint 32 are shown. In some embodiments, the axial movement joint 32 is a ballspline that includes a plurality of ball bearings 68 positioned between the larger diameter portion 43 of the female shaft 42 and the male shaft 46. The larger diameter portion 43 of female shaft 42 includes a plurality of slots 98 formed on the inner surface of the shaft as shown in FIG. 9. Likewise, the male shaft 46 includes a plurality of slots 100 formed on an outer surface of the male shaft 46 as shown in FIG. 10. The ball bearings are retained by a cage 102. In the embodiment shown in FIG. 10, six ball bearings 68 are located in each slot, although in other embodiments additional or fewer ball bearings 68 may be utilized.

Referring to FIGS. 6 and 10, the axial movement joint 32 is positioned in a fully extended state. In a fully collapsed state, the male shaft 46 moves axially within the female shaft 42 (to the left in the views shown in FIGS. 6 and 10) to accommodate axial plunge of half-shaft assembly 16. One or more move-in stops are utilized to determine the maximum axial movement of the ballspline in the fully collapsed state. Likewise, one or more move-out stops are utilized to determine the maximum axial movement of the ballspline in the fully extended state. With respect to the move-in stops utilized to control the axial movement in the fully collapsed state, female move-in stop 76 (i.e., ridge, or bump) is formed on the inner surface of the female shaft 42 as shown in FIG. 9 and the male move-in stop 78 is formed on the outer surface of the male shaft 46 as indicated by the change in diameter or ridge provided at the end of slots 100. With respect to the female move-in stop 76, in some embodiments the ridge is formed as a result of friction welding the smaller diameter portion 41 to the larger diameter portion 43. In other embodiments, the female move-in stop 76 may be machined or otherwise fabricated on the inner surface of the larger diameter portion 43 of the female shaft 42 to provide a change in diameter (i.e., narrowing) that prevents the cage 102 and/or ball bearings 68 from extending beyond the stop. Although not illustrated, if half-shaft assembly 16 was fully collapsed, interaction between the female move-in stop 76 and cage 102 prevents the male shaft 46 from bottoming or hitting the female shaft 42. Likewise, the male move-in stop 78 is formed at the end of the slots 100 formed in the outer surface of the male shaft 46. The increase in diameter of the male shaft 46 prevents the ball bearings from extending beyond the male move-in stop 78 in a fully collapsed state. In some embodiments, the trailing arms 22 and shock absorbers 18 determine the amount of axial plunge allowed, and therefore neither the female move-in stop 76 or the male move-in stop 78 are ever intended to be utilized during operation to stop the axial movement of the male shaft 46 relative to the female shaft 42. However, prior to installation of the half-shaft assembly 16, the female move-in stop 76 and male move-in stop 78 may be utilized to prevent the half-shaft assembly from fully collapsing.

In addition to the female move-in stop 76 and male move-in stop 78 formed on the inner and outer surfaces of the female and male shafts 42 and 46, respectively, additional move-out stops 72 and 74 are utilized to set the boundaries for the fully extended state. In the embodiment shown in FIG. 10 move-out stops 72 and 74 are utilized to prevent the male shaft 46 from extending beyond a fully expanded state—thereby disconnecting the male shaft 46 from the female shaft 42. In some embodiments, move-out stop 72 is located on the outer circumference of the male shaft 46 to act as one of the move-out stops to prevent the male shaft 46 from extending beyond a fully extended state. For example, in some embodiments move-out stop 72 is a retaining ring (e.g., C-shaped snap ring) positioned within a groove formed within the outer surface of male shaft 46. Likewise, in some embodiments move-out stop 74 is a retaining ring (e.g., C-shaped snap ring) positioned within a groove formed within the inner surface of the female shaft 42. The move-out stop 74 similarly interacts with the ball bearings 68 to prevent the male shaft 46 from extending beyond a fully extended state.

Contact between the ball bearings 68 and the move-out stop 72 and/or move-out stop 74 is not sequenced. That is, movement towards a fully expanded state may result in select ball bearings 68 contacting move-out stop 72 first and subsequently move-out stop 74. However, movement towards a fully expanded state may also result in select ball bearings 68 contacting move-out stop 74 first and subsequently move-out stop 74. When in a fully expanded state, both move-out stops 72 and 74 will be engaged with the ball bearings 68 to prevent the male shaft from being disconnected or removed from the female shaft 42.

As described above, in some embodiments the trailing arms 22 and shock absorbers 18 determine the extension point of the male shaft 46 relative to the female shaft 42, and therefore neither the move-out stop 72 or the move-out stop 74 are ever intended to be utilized during operation to stop the axial movement of the male shaft 46 relative to the female shaft 42. However, prior to installation of the half-shaft assembly 16, the move-out stops 72 and 74 may be utilized to prevent the half-shaft assembly from fully extending, resulting in removal of the male shaft 46 relative to the female shaft 42.

In some embodiments, to remove male shaft 46 from the female shaft 42 the axial boot cover 44 is disconnected from the female shaft 42 and/or from male shaft 46. Once the axial boot cover 44 is removed, move-out stop 74 is removed from the inner surface of female shaft 42. For example, if move-out stop 74 is a retaining ring, such as a C-shaped snap ring, the ring can be compressed and then removed from the groove formed within the inner surface of female shaft 42. Removal of move-out stop 74 allows the ball bearings 68 to slide past that position and allows male shaft 46—along with ball bearings 68 and cage 102—to be removed from female shaft 42. Likewise, installation of male shaft 46 into female shaft 42 requires male shaft 46, ball bearings 68 and cage 102 to be inserted into female shaft, and for move-out stop 74 to be inserted into the groove formed within the inner surface of female shaft 42.

In some embodiments, all axial movement or plunging of the half-shaft assembly 16 is accommodated by the axial movement of the axial movement joint 32. That is, neither the inboard CV joint 30 nor the outboard CV joint 34 provides any substantial axial movement or plunge. A benefit of this approach is that all axial movement is controlled by the axial movement joint 32 (e.g., ballspline). In some embodiments, this provides improved control of plunge position as compared to embodiments that provide plunging at one or both of the CV joints 30 and 34. In some embodiments, axial movement joint 32 provides axial plunge greater than that available from typical CV joints. For example, in some embodiments the half-shaft assembly 16 provides axial plunge depths equal to or greater than 97 mm. In some embodiments, the half-shaft assembly 16 provides axial plunge depths of equal to or greater than 122 mm. In some embodiments, axial boot cover 44 is selected to handle axial loads/movement and does not need to accommodate angular deflection loads. Likewise, the CV boot covers 40 and 48 are selected to handle angular deflections and do not need to accommodate axial loads. That is, each boot cover is selected to handle one type of movement/load, rather than having to accommodate both linear and angular deflections. In other embodiments, one or more of the inboard CV joint 30 and/or outboard CV joint 34 may provide additional axial movement in additional to angular deflection of the shafts relative to one another.

As described above, CV boot cover 40 is affixed on one end to the larger diameter portion 43 of female shaft 42 and on the other end to male shaft 46 by fasteners or clamps 56 (e.g., clamps). The interior region defined within CV boot cover 40 is packed with grease to provide protection for the ball bearings. In addition, during collapse/expansion of the axial movement joint 32 the volume within the CV boot cover 40 changes rapidly. In some embodiments, air is allowed to flow between the region defined by axial boot cover 44 (region 'D' as shown in FIG. 4) and the hollow regions within one or more of female shaft 42 and/or male shaft 46 (regions 'B' and 'C' as shown in FIG. 4). The increase in total volume added by these regions decreases the change in pressure experienced within the region defined by the axial boot cover 44 during rapid collapse/expansion of the axial movement joint 32.

Figure 5:
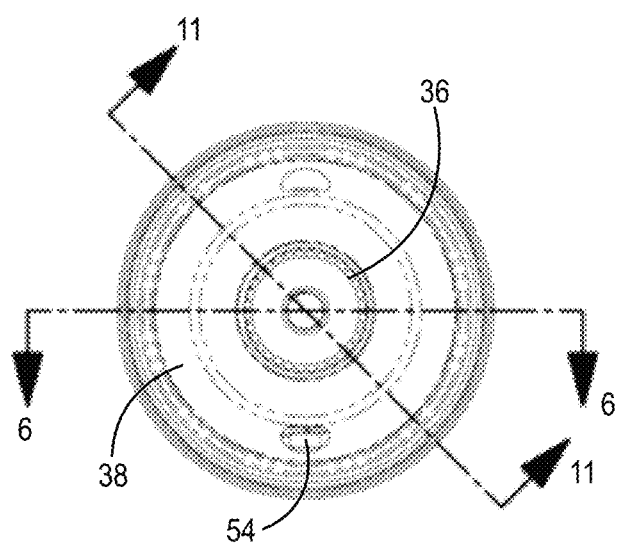
FIG. 5 is an end view of the half-shaft assembly according to some embodiments.
Figure 12:
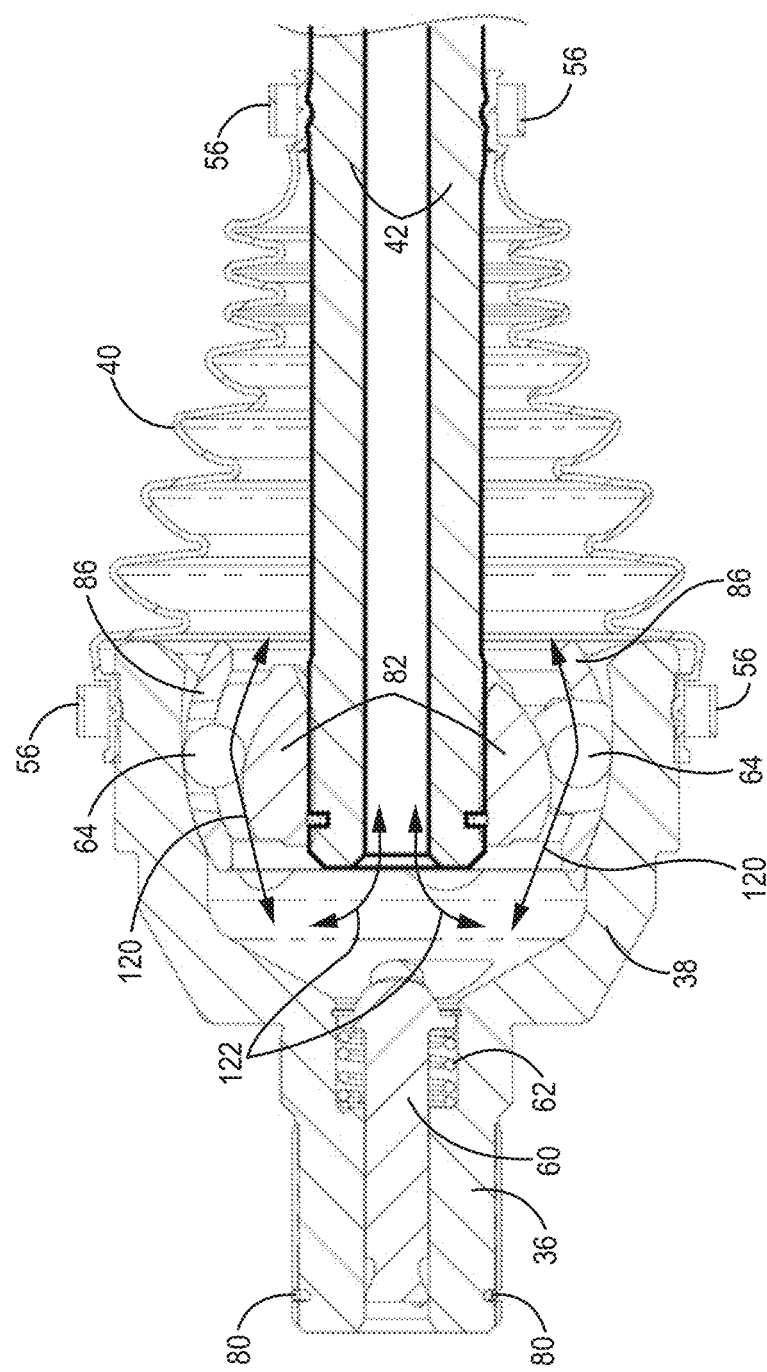
FIG. 12 is a magnified cross-sectional view the inboard CV joint shown in FIG. 11 according to some embodiments.
Figure 13:
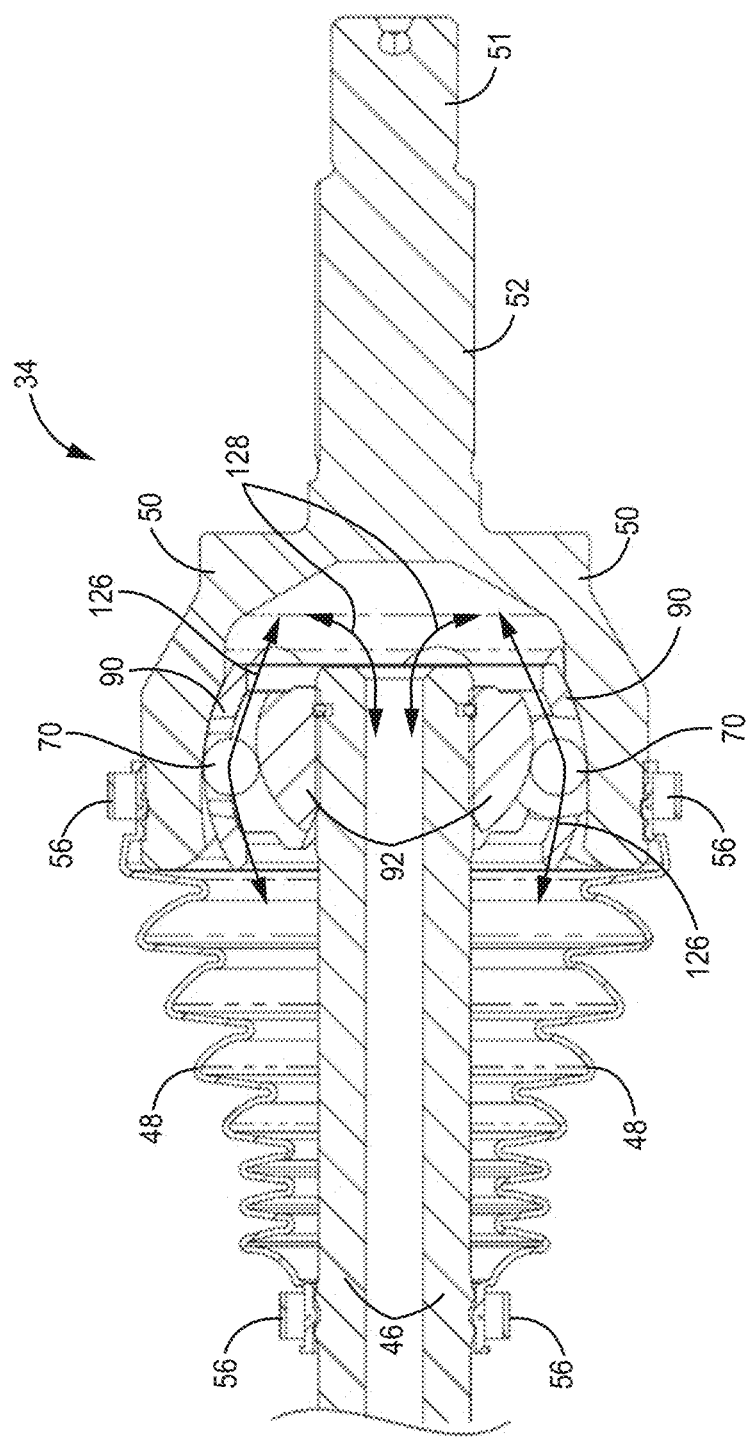
FIG. 13 is a magnified cross-sectional view of the outboard CV joint shown in FIG. 11 according to some embodiments.
Figure 14:
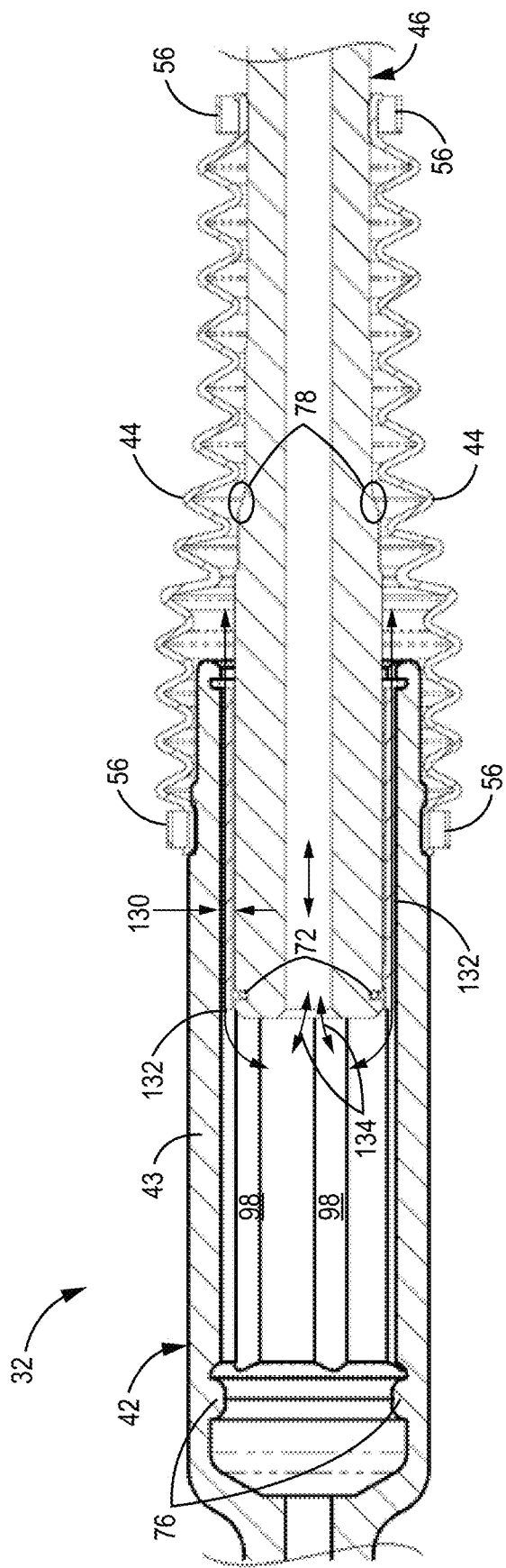
FIG. 14 is a magnified cross-sectional view of the axial movement joint shown in FIG. 11 according to some embodiments.

Referring to FIGS. 11-14, cross-sectional views of the half-shaft assembly 16 taken along line 11-11 in FIG. 5 are shown. These cross-sectional views are taken along a slightly different angle, and in particular illustrate the flow paths for air between the various regions. For example, FIG. 12 is a cross-sectional view of inboard CV joint 30 that illustrates the flow path between the region within CV boot cover 40 (i.e., region 'A' in FIG. 4) and the region within the female shaft 42 (i.e., region 'B' in FIG. 4). As illustrated by arrows 120 and 122, air volume is shared between the region within the CV boot cover 40, the region within CV housing 38, and the hollow portion of female shaft 42. Similarly, FIG. 13 is a cross-sectional view of inboard CV joint 34 that illustrates the flow path between the region within CV boot cover 48 (i.e., region 'E' in FIG. 4) and the region within the hollow male shaft 46 (i.e., region 'C' in FIG. 4). As illustrated by arrows 126 and 128, air volume is shared between the region within the CV boot cover 48, the region within CV housing 50, and the hollow portion of male shaft 46. FIG. 14 is a cross-sectional view of the axial movement joint 32 that illustrates the air gap 130 located adjacent the ball bearings 68 (not visible in this view). The air gap 130 is provided between the inner surface of the female shaft 42 and the outer surface of the cage 102 as well as between the inner surface of the cage 102 and the outer surface of the male shaft 46. As illustrated by arrows 132 and 134, air volume is shared by the region within axial boot cover 44 (i.e., region 'D' in FIG. 4), the hollow portion of female shaft 42 (i.e., region 'B' in FIG. 4), and the hollow portion of male shaft 46 (i.e., region 'C' in FIG. 4).

Figure 15:
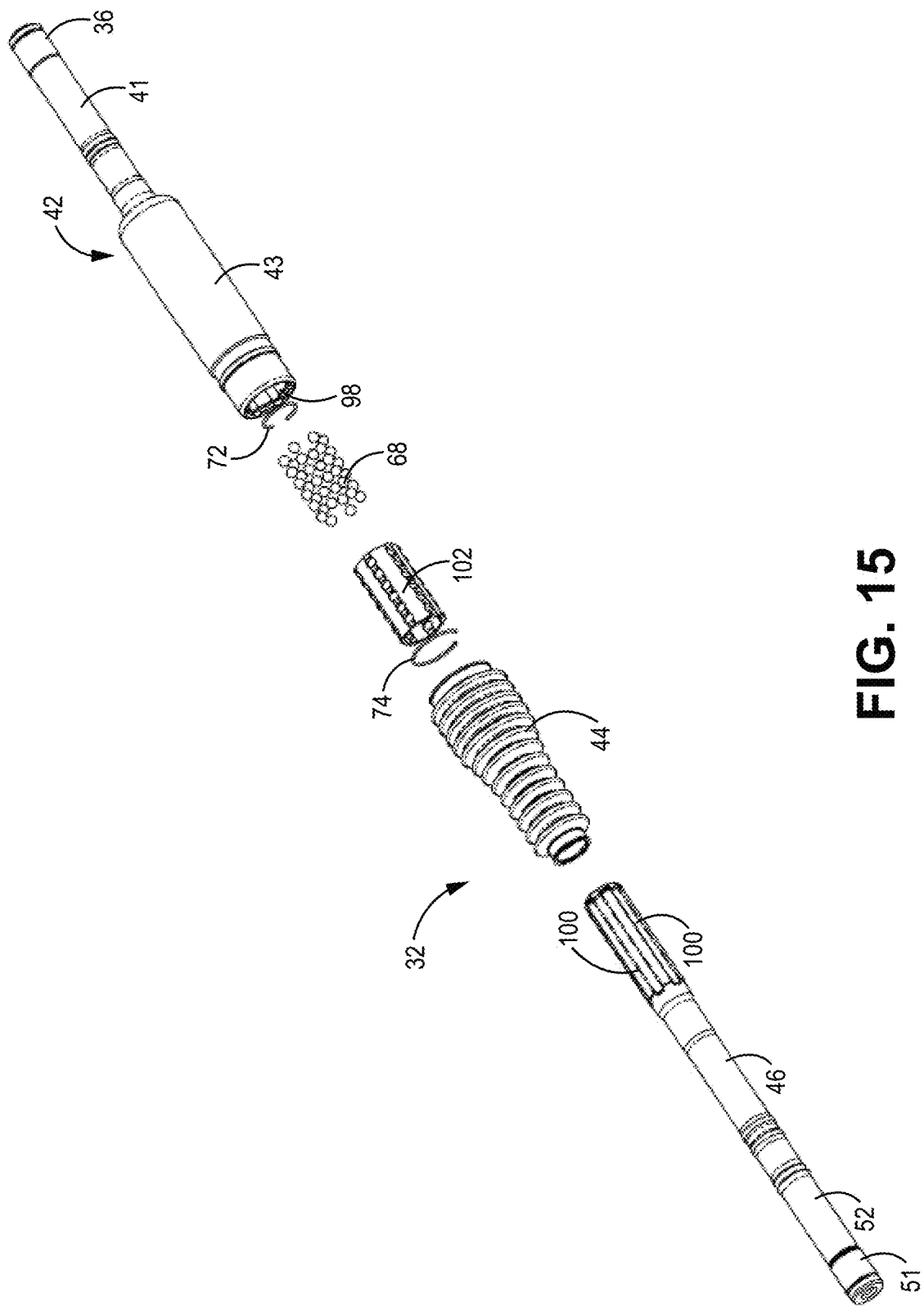
FIG. 15 is a perspective exploded view of the axial movement joint according to some embodiments.
Figure 16:
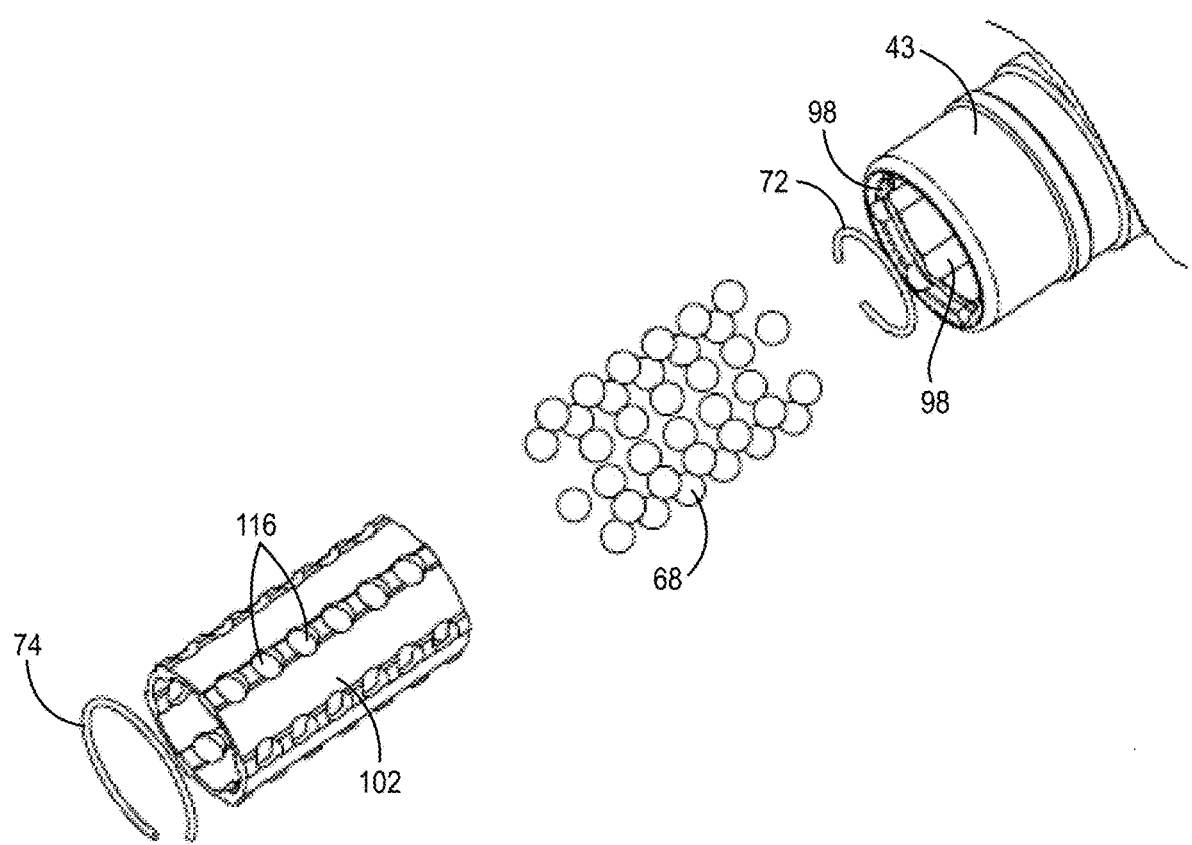
FIG. 16 is a perspective exploded view of the cage, balls, and snap rings utilized as part of the axial movement joint according to some embodiments.
Figure 17:
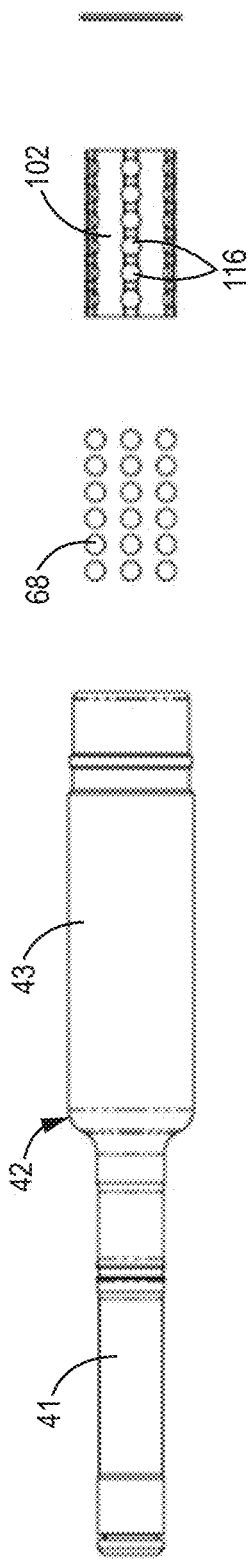
FIG. 17 is a side exploded view of the axial movement joint according to some embodiments.
Figure 18:
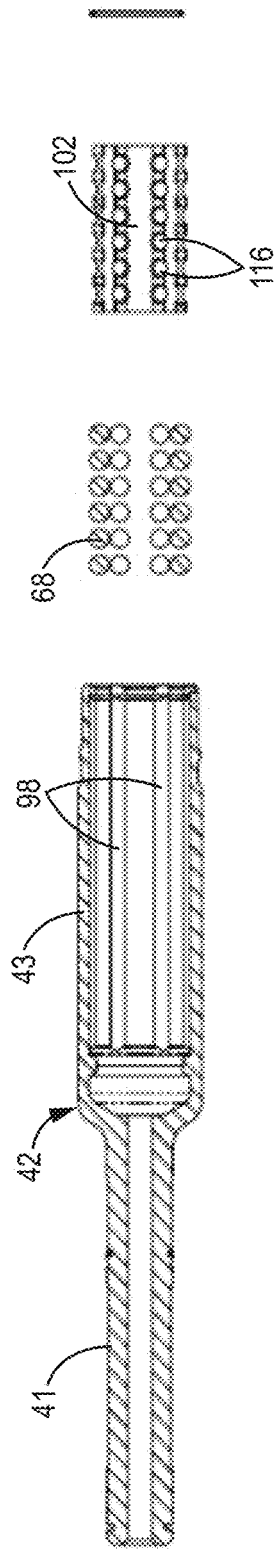
FIG. 18 is a cross-sectional exploded view of the axial movement joint taken along line 18-18 in FIG. 17 according to some embodiments.

Referring to FIGS. 15-18, exploded views of the axial movement joint 32 are shown. In some embodiments, the cage 102 includes a plurality of apertures 116 sized to accommodate the plurality of ball bearings 68, each ball bearing 68 fitting within one of the apertures 116. The cage 102 maintains the ball bearings in the desired position relative to one another while allowing the ball bearings 68 to rotate and move between the female slots 98 formed within the inner surface of the larger diameter portion 43 and the slots 100 in the outer surface of the male shaft 46. With respect to the male shaft 46, the plurality of slots 100 formed on the outer surface of the male shaft 46 are shown, wherein the ball bearings 68 retained within the cage 102 are allowed to roll and/or slide along the length of the slots 100. Similarly, the plurality of slots 98 formed on the inner surface of the female shaft 42 are partially shown, wherein the ball bearings 68 retained within the cage 102 are allowed to roll and/or slide along the slots 98 along the length of the larger diameter portion 43 of female shaft 42. In addition, FIGS. 15 and 16 illustrate the geometry and shape of move-out stop 72 and move-out stop 74. In some embodiments, the move-out stops 72 and 74 are C-shaped snap rings that fit within the female shaft 42 on opposite sides of the cage 102. In some embodiments, four rows of ball bearings 68 are housed within the cage 102 as shown for example in FIGS. 17 and 18.

In this way present disclosure discloses a half-shaft assembly capable of use in a variety of types of vehicles to transmit power from a driveline to the wheels. In some embodiments, the half-shaft assembly includes a first constant velocity (CV) joint, a second CV joint, and an axial movement joint that includes a first shaft connected to the first CV joint and a second shaft connected to the second CV joint. The axial movement joint allows movement—referred to herein as axial plunge—of the half-shaft assembly along the axis of the shaft. In some embodiments, the first CV joint includes a first CV boot cover, the second CV joint includes a second CV boot cover, and the axial movement joint includes an axial boot cover. In some embodiments, one or both of the first shaft and the second shaft are hollow such that chamber defined by the third boot has access to or is in fluid communication with the volume of air located in one or both of the first and second shafts. In some embodiments, the third boot is also fluidly connected with one or both of the chambers defined by the first CV boot cover or the second CV boot cover associated with the first and second CV joints, respectively.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A recreational vehicle comprising:
a frame;
a plurality of trailing arms;
a plurality of ground engaging members, each ground engaging member including a wheel, wherein at least one wheel is secured to the frame via one of the trailing arms;
an engine;
a driveline connected to the engine;
a half-shaft assembly configured to communicate power from the driveline to one of the plurality of wheels, the half-shaft assembly comprising:
an axial movement joint having:
a first shaft and a second shaft, wherein rotational input received on the first shaft is communicated to the second shaft, and wherein the axial movement joint allows axial movement of the first shaft relative to the second shaft, the axial movement joint having an axial boot cover coupled on a first end to the first shaft and on a second end to the second shaft that accommodates axial movement of the first shaft relative to the second shaft, wherein at least one of the first shaft and the second shaft are hollow and in fluid communication with an interior of the axial boot cover; and
a plurality of ball bearings retained within a cage positioned between the first shaft and the second shaft to allow axial plunge or movement of the second shaft relative to the first shaft;
a first constant velocity (CV) joint coupled to transmit rotational input received from the driveline to the first shaft, the first CV joint having a first CV boot cover, wherein the first shaft is a hollow shaft and the interior of the axial boot cover is in fluid communication with an interior of the first CV boot cover via the hollow first shaft; and
a second CV joint coupled to transmit rotational output received from the second shaft to one of the plurality of wheels, the second CV joint having a second CV boot cover.

2. The recreational vehicle of claim 1, wherein the second shaft moves axially within the first shaft.

3. The recreational vehicle of claim 2, wherein the second shaft is hollow, wherein the interior of the axial boot cover is in fluid communication with an interior of the hollow first shaft and an interior of the hollow second shaft.

4. The recreational vehicle of claim 2, wherein the first shaft includes a larger diameter portion and a small diameter portion, wherein the second shaft is configured to slide axially within the larger diameter portion of the first shaft.

5. The recreational vehicle of claim 1, wherein axial plunge of the second shaft relative to the first shaft is determined by the connection of the trailing arm to the respective wheel.

6. The recreational vehicle of claim 1, wherein the first CV joint and the second CV joint accommodate only angular deflections and the axial movement joint accommodates only linear deflections.

7. The recreational vehicle of claim 6, wherein the first CV boot cover and the second CV boot cover accommodate angular deflections and the axial boot cover accommodates linear deflections.

8. The recreational vehicle of claim 1, wherein the axial movement joint provides axial plunge or movement equal to or greater than 97 millimeters (mm).

9. The recreational vehicle of claim 1, wherein the axial movement joint provides axial plunge or movement equal to or greater than 122 millimeters (mm).

10. The recreational vehicle of claim 1, wherein the first shaft is a hollow female shaft including a plurality of slots formed within an inner surface of the first shaft, wherein the plurality of slots are configured to receive one or more of the plurality of ball bearings and wherein the second shaft includes a plurality of slots formed on an outer surface of the second shaft, wherein the plurality of slots are configured to receive one or more of the plurality of ball bearings.

11. The recreational vehicle of claim 1, wherein the axial movement joint includes at least one of a move-in stop and a move-out stop, wherein the at least one move-in stop includes a ridge formed on an inner surface of the hollow first shaft, wherein the at least one move-out stop includes a first snap ring positioned on an outer surface of the second shaft, at a distal end of the second shaft.

12. A recreational vehicle comprising:
a frame;
a plurality of trailing arms;
a plurality of ground engaging members, each ground engaging member including a wheel, wherein at least one wheel is secured to the frame via one of the trailing arms;
an engine;
a driveline connected to the engine;
a half-shaft assembly configured to communicate power from the driveline to one of the plurality of wheels, the half-shaft assembly comprising:
a first constant velocity (CV) joint having a CV housing, a plurality of ball bearings, a cage, and an inner race;
a hollow female shaft having a smaller diameter portion and a larger diameter portion, the smaller diameter portion coupled to the inner race of the first CV joint;

a first CV boot cover having a first end and a second end, the first end secured to the CV housing of the first CV joint and the second end secured to the smaller diameter portion of the hollow female shaft;

a second CV joint having a CV housing, a plurality of ball bearings, a cage, and an inner race;

a male shaft having a first end and a second end, the first end coupled to the inner race of the second CV joint;

a second CV boot cover having a first end and a second end, the first end secured to the CV housing of the second CV joint and the second end secured to the male shaft;

a ballspline mechanism that includes a plurality of ball bearings retained within a cage, wherein the ballspline mechanism is located between an inner surface of the larger diameter portion of the hollow female shaft and an outer surface of the hollow male shaft; and an axial boot cover having a first end and a second end, the first end secured to an outer surface of the larger diameter portion of the hollow female shaft and the second end secured to an outer surface of the male shaft, wherein an interior of the axial boot cover is in fluid communication with an interior of the hollow female shaft.

13. The recreational vehicle of claim 12, wherein axial plunge of the male shaft relative to the hollow female shaft is determined by the connection of the trailing arm to the respective wheel.

14. The recreational vehicle of claim 12, wherein the larger diameter portion of the hollow female shaft includes a plurality of slots formed on the inner surface, wherein the plurality of slots formed on the inner surface of the hollow female shaft are configured to receive one or more of the plurality of ball bearings and wherein the hollow male shaft includes a plurality of slots formed on the outer surface, wherein the plurality of slots formed on the outer surface of the hollow male shaft are configured to receive one or more of the plurality of ball bearings.

15. The recreational vehicle of claim 12, wherein a flow passage is provided between the inner surface of the hollow female shaft and an outer surface of the cage and between the outer surface of the male shaft and an inner surface of the cage.

16. The recreational vehicle of claim 12, wherein a hollow portion of the hollow female shaft is in fluid communication with an interior region of the first CV boot cover.

17. The recreational vehicle of claim 12, wherein the male shaft is hollow and wherein the interior of the axial boot cover is in fluid communication with an interior portion of the second CV boot cover via the hollow male shaft.

* * * * *